Nov. 4, 1969  E. J. SOUTHERN  3,476,027
PHOTOGRAPHIC FILM MAGAZINE

Filed March 1, 1967  2 Sheets-Sheet 1

INVENTOR.
EDWARD J. SOUTHERN
BY
Stanley H. Rosen
ATTORNEY.

Nov. 4, 1969 E. J. SOUTHERN 3,476,027
PHOTOGRAPHIC FILM MAGAZINE
Filed March 1, 1967 2 Sheets-Sheet 2
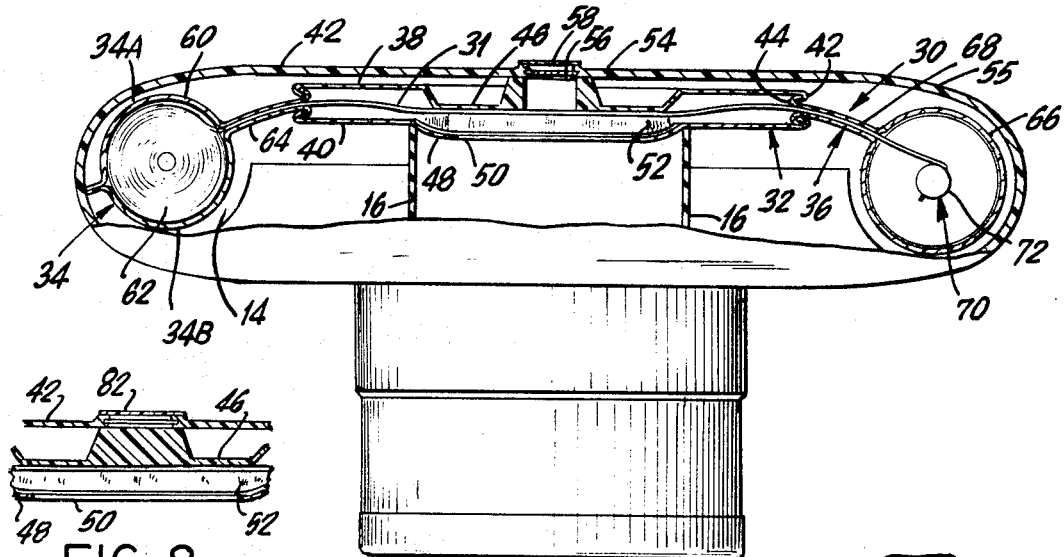
FIG. 8
FIG. 3
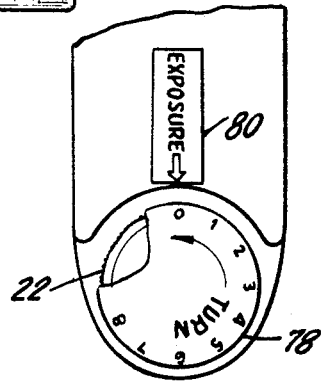
FIG. 6
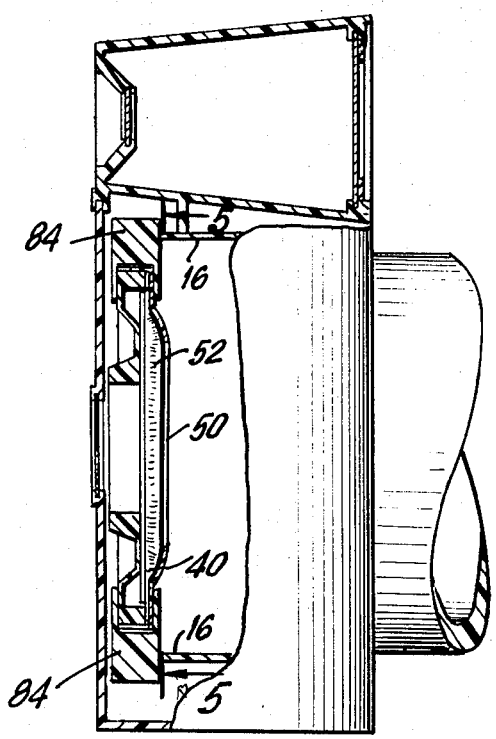
FIG. 4
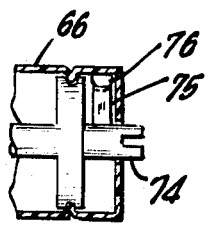
FIG. 7
INVENTOR.
EDWARD J. SOUTHERN
BY
Stanley J. Rosen
ATTORNEY

United States Patent Office

3,476,027
Patented Nov. 4, 1969

3,476,027
PHOTOGRAPHIC FILM MAGAZINE
Edward J. Southern, % Wagner, Box 448,
Flushing, N.Y. 11352
Filed Mar. 1, 1967, Ser. No. 619,837
Int. Cl. G03b *19/04*
U.S. Cl. 95—31                    3 Claims

ABSTRACT OF THE DISCLOSURE

The photographic film magazine disclosed herein is intended to be utilized with existing rollfilm-type or casette-type cameras and comprises a center part having a frame opening for the film, a film receptacle part and a film take-up part, all of which are arranged for easy insertion in the back of the camera without the threading of any film. The magazine is adjustable in size to fit different sizes of cameras.

BACKGROUND OF THE INVENTION

Field of the invention

The invention relates to photography and, more particularly, to a photographic film magazine for existing rollfilm-type and casette-type cameras.

Description of prior art

The photographic film magazines presently on the market are designed and intended to be utilized with special instant-load type cameras which have been specially designed to receive such film magazines. Accordingly, if one desires to eliminate the time consuming and tedious task of threading film for loading one's camera, it is necessary to purchase both the film magazine and the camera with which it was intended to be used.

SUMMARY OF THE INVENTION

Briefly described, the present invention provides a photographic film magazine which permits instant film loading of existing rollfilm-type and casette-type cameras of various sizes such as cameras which normally utilize #127, #620 or #120 film.

The magazine comprises a center part having a frame opening for the film, a film receptacle part and a film takeup part. The parts are adjustable in size with respect to each other to fit the various sizes of cameras or the parts may be non-adjustable to fit a particular size camera. Moreover, the magazine is provided with a film light protector which permits the user to remove the magazine from the camera and replace it later in the camera with the loss of only a single unexposed frame of the film. The film of the magazine need be provided with a minimum amount of backing paper. A simple stop mechanism is provided for easy and automatic movement of the film into the next picture taking position and, in addition, no backing paper or opening in the back of the camera is needed to determine the film exposure number. The magazine is constructed to permit easy removal and replacement of the film so that the magazine may be repeatedly used with new supplies of film.

BRIEF DESCRIPTION OF THE DRAWING

FIG. 3 is a view taken on line 3—3 of FIG. 2 with the cover of the camera in closed position;

FIG. 4 is a view taken on line 4—4 of FIG. 2 with the cover of the camera in closed position;

FIG. 6 is a partial view of the camera winding knob and adjacent portion of the camera;

FIG. 7 is a detail view illustrating the film stop of the present invention; and FIG. 8 is a partial detail view illustrating a modification.

DESCRIPTION OF THE PREFERRED EMBODIMENTS

Figure 1:
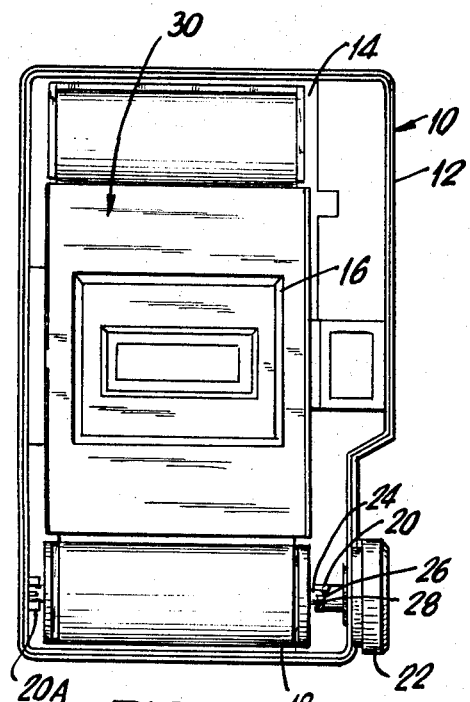
FIG. 1 is a view of the back of a rollfilm-type camera, with the back cover of the camera removed, showing the photographic film magazine of the present invention in operative position in the camera.
Figure 2:
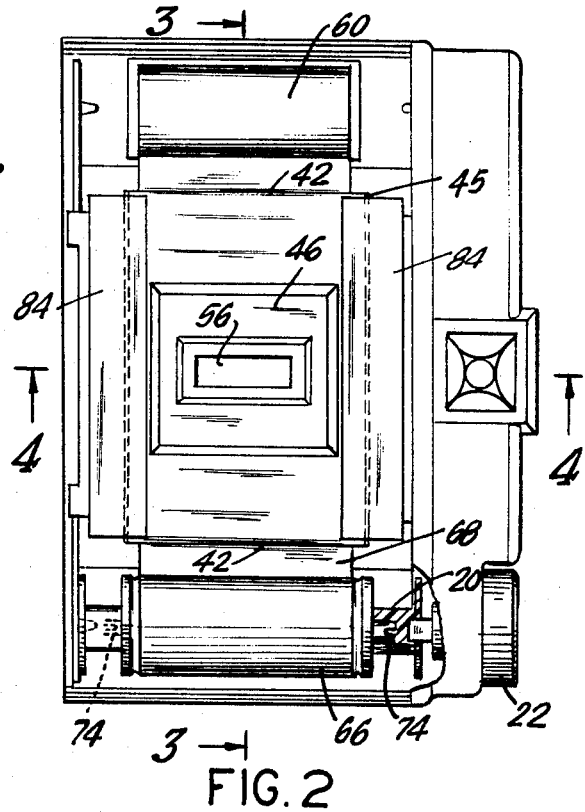
FIG. 2 is a view of the back of another and larger rollfilm-type camera, with the back cover of the camera removed, showing the photographic film magazine adjusted in size and in operative position in the camera.
Figure 5:
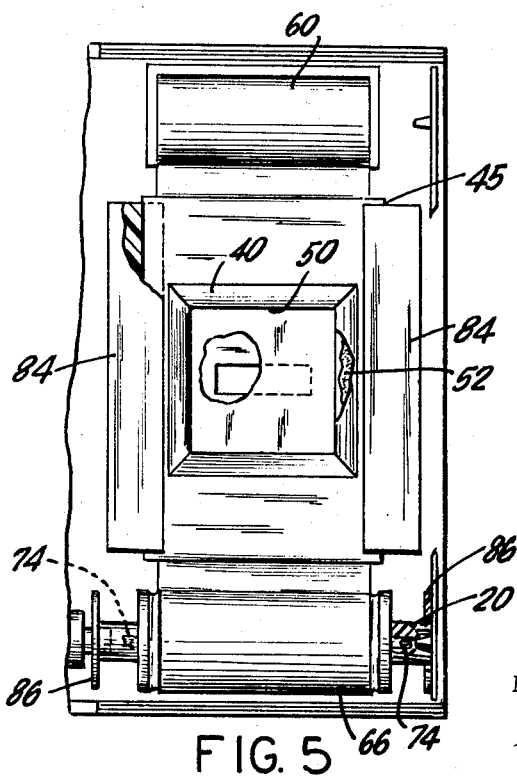
FIG. 5 is a partial view taken from the underside of FIG. 2 at the position of line 5—5 of FIG. 4.

Referring to FIG. 1, the camera 10 is any one of the well-known rollfilm-type cameras which comprises, briefly, a body portion 12 having film recess portion 14 at one end to receive the spool of film, an intermediate film-supporting portion 16 over which the film is drawn and supported, and another film recess portion 18 at the opposite end of the body portion 12 to receive the film take-up spool. The film take-up spool is operated by a hollow shaft 20 which extends from a winding knob 22 and is provided with a bifurcated part 24 which divides the hollow shaft into two recesses 26 and 28 for endwise receipt of the shaft extension of the take-up spool.

The photographic film magazine 30 of the present invention, as illustrated by FIGS. 1 and 3, and which contains a length of photographic film 31, comprises a center part 32, a film receptacle part 34 at one side of the center part, and a film take-up part 36 at the opposite side of the center part, all of the aforesaid parts, except as hereinafter described, being made of flexible black sheet material (paper or plastic), so that the end parts 34 and 36 can bend relative to the center part 32, as shown in FIG. 3. This flexibility of the end parts of the magazine permits the magazine to accommodate itself readily to the various depths of the body portions of the various sizes of cameras.

Center part 32 comprises a pair of superposed longitudinally extending sheet members 38 and 40 whose ends have inturned lips 42 which releasably engage outturned lips 44 of the end parts 34 and 36 to stop outwardly extending movement of the latter as will be more fully understood hereinafter. The longitudinally extending side edges 45 of the sheet members are held together by pressure sensitive adhesive so that they can be easily pried apart for removal of the used film as well as being easily stuck together again for reuse after new film has been placed in the magazine. The center portion of center part 32 includes depressed film frame parts 46 and 48 in each of members 38 and 40, respectively. Frame part 48 has a cutout 50 for exposure of the film and the marginal peripheral edge portion of the cutout is provided with a peripheral extending resilient cushion 52 (pile velvet) against which the film is resiliently biased by frame part 46 in light sealing relation with the cushion. Frame part 54 which is in resilient contact with the back 55 of the camera which provides the biasing force to insure the light-tight seal surrounding the film in the area of the frame opening 50. Part 54 has an opening 56 therethrough to expose the exposure numbers on the backing paper on the back of the film. The usual window 58 in the back of the camera is in line with part 54. It is to be understood, however, as described hereinafter, that the backing paper can be eliminated and the camera back need not have a window nor need the magazine.

The frame opening 50 is preferably of a size for accommodating 35 mm. film which still enables the magazine to function properly in cameras which use larger size film, such as #127 and #620, so that satisfactory pictures may still be taken with a smaller and therefore more economical film. Moreover, since there is a predominance of #127 cameras, the magazine is preferably made to fit such cameras and, as will be more fully understood hereinafter, is adjustable for the larger size cameras.

Film receptacle part 24 comprises a cylindrical film receptacle portion 60 which contains the roll 62 of unexposed film and a wing portion 64 extending from the receptacle portion and having the previously mentioned lips 44 at its end. Part 34 is made of two identical members 34A and 34B of flexible sheet material, in the form shown, which are joined to each other along their peripheral edge portions by pressure sensitive adhesive which permits them to be easily joined and rejoined. It is to be noted that the film receptacle portion 60 has no shaft extensions and rests in recess 14 of the camera. This permits receptacle portion 60 to be inserted in the recess 14 without the need to insert shaft ends into camera receiving parts as is necessary with the present spool film.

Film take-up part 36 comprises a cylindrical film take-up receptacle portion 66 and a wing portion 68 extending therefrom and having the previously mentioned lips 44 at its end. Part 36 and part 34 are similar in construction. However, receptacle portion 66 contains a reel 70 preferably of metal, upon which the film is to be wound. The reel includes a longitudinally extending shaft 72 having ends 74 which extend outwardly therefrom and are releasably engaged, respectively, in the extension 20 of the film take-up knob 22 of the camera and in the opposite and similar extension 20A of the camera to support the receptacle portion 66 in the camera and to permit its operation by the camera knob. Preferably ends 74 are designed to fit #127 cameras, and are adapted to receive extensions for larger size cameras, as described hereinafter.

In the embodiment just described, the back of the film 31 is provided with the usual backing sheet (not shown) upon which are printed the exposure numbers of the film which can be seen through windows 58 and 56, respectively. The backing sheet need be used only to indicate the film exposure number. Pursuant to the foregoing, the shaft 72 is provided with a radially extending spring contact member 75 (FIG. 7) which engages a projection or stop 76 on the inner surface of receptacle portion 66 and in the path of rotation of the contact member. As the shaft 72 completes one rotation which moves the film longitudinally through center part 32 for positioning the next portion of the film in opening 50, member 75 hits projection 76 and the camera operator knows the film is in position for the next picture. A firm rotation of knob 22 of the camera moves member 75 past projection 76. The diameter of end 74 is selected so that, in the case where 35 mm. film is being used, one rotation of end 74 will move a sufficient amount of film so that a succeeding unexposed portion thereof is moved into the frame opening.

If it is desired to eliminate the backing sheet from the film, and still know how many exposures have been made, a slip-on knob or cover 78 (FIG. 6) is provided which may be placed on the winding knob 22 of the camera. Also, a stick-on arrow decal 80 is provided to be placed on the camera. Rotation of the camera knob 22 to successive numbers on the slip-on knob 78 will advance the film successive amounts for picture taking and indicate the exposures. Since the backing sheet is eliminated, window 58 may be covered with black tape 82, as illustrated by FIG. 8. However, the magazine need not now be provided with an opening 56, as illustrated by FIG. 8. In this form of the magazine with its light-tight frame opening, the magazine may be readily removed from the camera and reinserted, as for example, removing a magazine containing black and white film and replacing it with one containing color film, and thereafter reinserting the black and white film magazine. During such replacements, only one frame of unexposed film will become exposed because of the usual advancement of the film by the user after each exposure.

While the use of the slip-on knob both advances the film and indicates exposure number, stop 75–76 indicates to the operator, by feel, when the correct amount of film has been advanced, thus eliminating any visual observation of exposure numbers on the back of film or on slip-on knobs.

Film magazine 30 is adjustable in length and width to accommodate various sizes of the rollfilm-type or casette-type cameras. The length of the magazine is adjusted by moving end parts 34 and 36 toward and away from center part 32. The outward movement of the end parts is automatically stopped by the interengagements of lips 42 and 44. The width of the film magazine is increased by attaching longitudinally extending fins 84 to center part 32 so that the fins can rest on supports 16 of the camera (FIG. 4). The fins each comprise a folded-over sheet member which is greatly exaggerated in FIG. 4 for illustrating purposes. Pressure sensitive adhesive on the inner surfaces of the member permits easy attachment to the center part of the film magazine.

To enable shaft 72 of the film take-up reel 70 to be releasably connected to shaft support parts 20 and 20A of the wider camera, a pair of snap-on shaft extension members 86 are attached to the ends 74 of the shaft, thereby increasing the length thereof. Such members will have recesses to fit the shaft support parts of the larger camera. In this manner, the length of shaft 72 is effectively increased by providing new ends therefor which fit into parts 20 and 20A of the camera, exactly as shaft 72 would in a smaller sized camera.

No adjustment of size is necessary for film receptacle part 34. However, if 35 mm. film is utilized as suggested above, the viewfinder area of the camera must be proportionately reduced with respect to the larger size #127 and #620 film.

I claim:
1. A photographic film magazine comprising, a center part having superposed longitudinally extending sheet members, a film receptacle part at one side of said center part having a film receptacle portion for the film, and a film take-up part at the opposite side of said center part having a film take-up portion for the film, said take-up portion having a shaft extending therethrough and therefrom for connecting to receiving means on a camera, one of said sheet members having a depressed cutout portion for exposure of the film, and the other of said sheet members having a corresponding depressed portion fitting into said cutout portion and resiliently biased against the peripheral edge of said cutout portion to press the film against the latter, said film receptacle part and said film take-up part each having parts extending longitudinally between said sheet members of said center part for sliding longitudinal movement therebetween toward and away from said center part, said parts of said film receptacle part and said film take-up part, and said sheet members having interengageable ends for limiting the movement of said film receptacle part and said film take-up part away from said center part.

2. A photographic film magazine comprising, a center part having superposed longitudinally extending sheet members, a film receptacle part at one side of said center part having a film receptacle portion for the film and a film take-up part at the opposite side of said center part having a film take-up portion for the film, said take-up portion having a shaft extending therethrough and therefrom for connecting to receiving means on a camera, one of said sheet members having a depressed cutout portion for exposure of the film and the other of said sheet members having a corresponding depressed portion fitting into said cutout portion and resiliently biased against the peripheral edge of said cutout portion to press the film against the latter, said film receptacle part and said film take-up part each having parts extending longitudinally between said sheet members of said center part for sliding longitudinal movement therebetween toward and away from said center part, said shaft extension means being removably mounted on each end of said shaft for extending the length thereof, and longitudinally extending fins are removably mounted along opposite longitudinally extending edges of said sheet members, said fins corresponding in width to the length of said shaft extension means.

3. A photographic film magazine comprising, a center part having superposed longitudinally extending sheet members, a film receptacle part at one side of said center part having a film receptacle portion for the film and a film take-up part at the opposite side of said center part having a film take-up portion for the film, said take-up portion having a shaft extending therethrough and therefrom for connecting to receiving means on a camera, one of said sheet members having a depressed cutout portion for exposure of the film, and the other of said sheet members having a corresponding depressed portion fitting into said cutout portion and resiliently biased against the peripheral edge of said cutout portion to press the film against the latter, said film receptacle part and said film take-up part each having parts extending longitudinally between said sheet members of said center part for sliding longitudinal movement therebetween toward and away from said center part, said one sheet member being continuous in body and having no openings therein.

References Cited
UNITED STATES PATENTS

| | | | |
|---|---|---|---|
| 2,381,033 | 8/1945 | Bolsey | 352—78 |
| 3,260,182 | 7/1966 | Nerwin | 95—37 |

NORTON ANSHER, Primary Examiner

J. F. PETERS, JR., Assistant Examiner

U.S. Cl. X.R.

242—71.2